United States Patent
Garnemark

(10) Patent No.: US 10,145,287 B2
(45) Date of Patent: Dec. 4, 2018

(54) DUAL CATALYTIC CONVERTER EXHAUST-GAS AFTERTREATMENT ARRANGEMENT

(71) Applicant: Volvo Car Corporation, Gothenburg (SE)

(72) Inventor: Oscar Garnemark, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/584,803

(22) Filed: May 2, 2017

(65) Prior Publication Data
US 2017/0335738 A1    Nov. 23, 2017

(30) Foreign Application Priority Data
May 17, 2016 (EP) ..................... 16169829

(51) Int. Cl.
*F01N 3/00* (2006.01)
*F01N 3/28* (2006.01)
(Continued)

(52) U.S. Cl.
CPC ........... *F01N 3/2882* (2013.01); *F01N 3/022* (2013.01); *F01N 3/032* (2013.01); *F01N 3/10* (2013.01); *F01N 3/36* (2013.01); *F01N 9/00* (2013.01); *F01N 13/011* (2014.06); *F01N 3/2892* (2013.01); *F01N 2240/36* (2013.01);
(Continued)

(58) Field of Classification Search
CPC ............... F01N 13/011; F01N 2240/36; F01N 2260/08; F01N 2260/14; F01N 2550/10; F01N 2900/08; F01N 2900/1602; F01N 3/022; F01N 3/10; F01N 3/2892; F01N 9/00
See application file for complete search history.

(56) References Cited

U.S. PATENT DOCUMENTS 8,707,683 B2 * 4/2014 Uhrich .................. F01N 3/0807
60/281
2005/0210865 A1 9/2005 Bolander et al.
(Continued)

FOREIGN PATENT DOCUMENTS

EP 1807611 A1 7/2007
EP 1869298 A2 12/2007

*Primary Examiner* — Audrey K Bradley
*Assistant Examiner* — Anthony Ayala Delgado
(74) *Attorney, Agent, or Firm* — Snyder, Clark, Lesch & Chung, LLP

(57) ABSTRACT

There is provided an exhaust-gas aftertreatment arrangement for an internal combustion engine comprising a first catalytic converter, a second catalytic converter arranged in parallel with the first catalytic converter, the first and second catalytic converters being arranged to receive exhaust gas from an engine, a connection pipe fluidly connecting an outlet of the second catalytic converter with an inlet of the first catalytic converter, thereby allowing a flow of exhaust gas through the connection pipe, and an outlet valve arranged in the outlet of the second catalytic converter and downstream of the location of the connection pipe, wherein the outlet valve is configured to control a flow of exhaust gas through the second catalytic converter. There is also provided a method for controlling an exhaust-gas aftertreatment arrangement.

14 Claims, 2 Drawing Sheets

(51) Int. Cl.
*F01N 3/022* (2006.01)
*F01N 3/032* (2006.01)
*F01N 3/36* (2006.01)
*F01N 3/10* (2006.01)
*F01N 9/00* (2006.01)
*F01N 13/00* (2010.01)

(52) U.S. Cl.
CPC ...... *F01N 2260/08* (2013.01); *F01N 2260/14* (2013.01); *F01N 2410/03* (2013.01); *F01N 2470/30* (2013.01); *F01N 2550/10* (2013.01); *F01N 2900/0601* (2013.01); *F01N 2900/08* (2013.01); *F01N 2900/1602* (2013.01); *Y02T 10/47* (2013.01)

(56) References Cited

U.S. PATENT DOCUMENTS

2007/0294999 A1* 12/2007 Yoshizaki .......... B01D 53/9431 60/274
2008/0289321 A1 11/2008 Lu et al.
2011/0094208 A1* 4/2011 Bauer .................... F01N 3/208 60/276

* cited by examiner

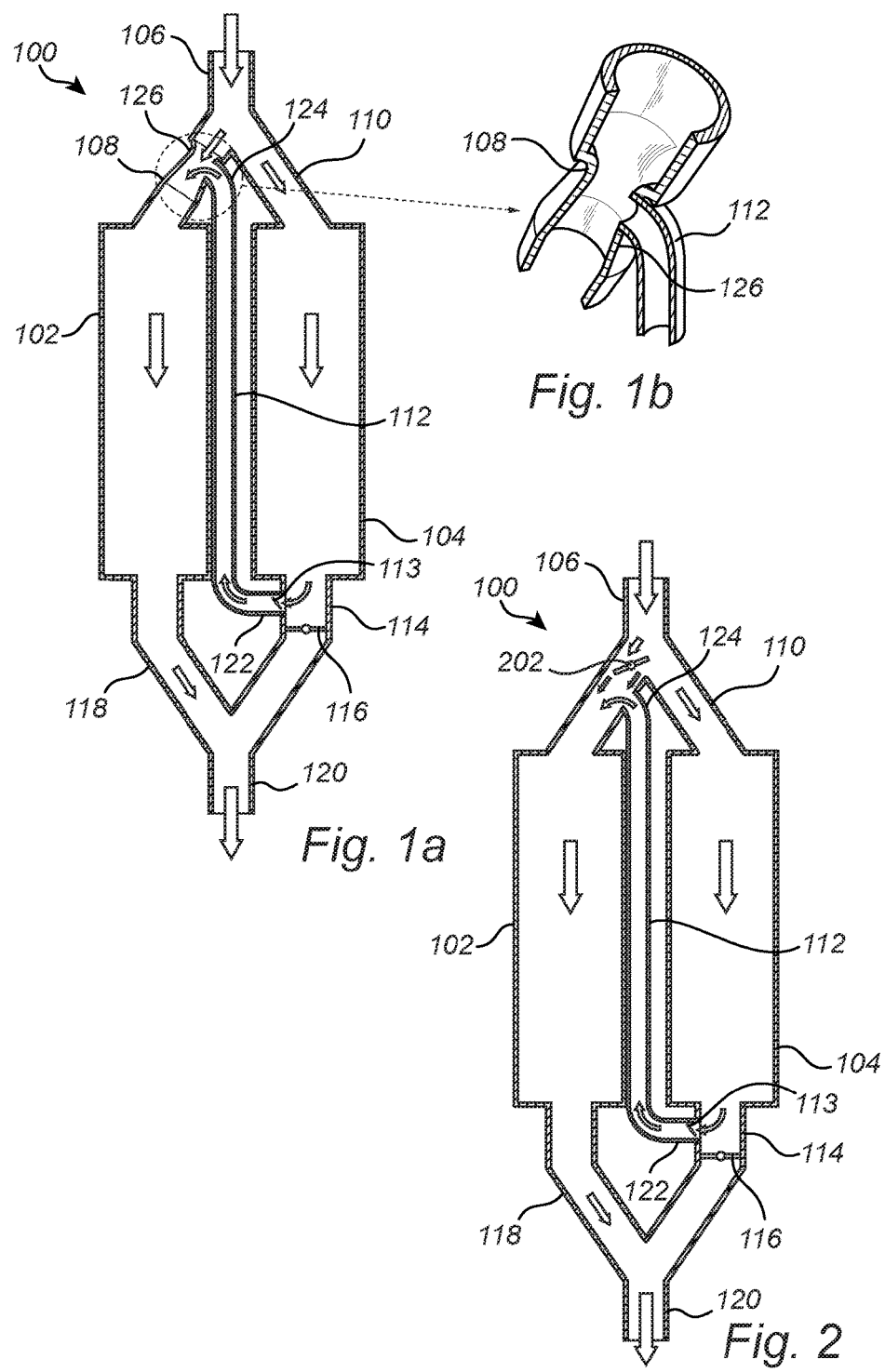

DUAL CATALYTIC CONVERTER EXHAUST-GAS AFTERTREATMENT ARRANGEMENT

RELATED APPLICATION

This application claims priority under 35 U.S.C. § 119 based on European Patent Application No. 16169829.5 filed May 17, 2016, the disclosure of which is hereby incorporated by reference herein.

TECHNICAL FIELD

The present invention relates to an exhaust-gas aftertreatment arrangement for improving catalytic conversion of exhaust gas emissions from an internal combustion engine. In particular, the invention relates to an exhaust-gas aftertreatment device comprising dual catalytic converters.

BACKGROUND

An exhaust-gas aftertreatment arrangement for an internal combustion engine in a vehicle typically comprises a catalytic converter for reducing harmful emissions. A catalytic converter in general comprises a canned and coated catalytic converter substrate in flow communication with inlet and outlet passages. It is positioned on the exhaust side of the internal combustion engine of the vehicle in order to treat exhaust gas emissions from the engine.

During cold start and warming-up of the engine, the catalytic converter is typically not sufficiently heated for optimum performance and the exhaust gas emissions may therefore pass through the catalytic converter without catalytic conversion thereof. To improve the heating properties, the catalytic converter is often positioned as close as possible to the exhaust ports. To accelerate heating, it is also possible to heat the catalytic converter electrically or to temporarily control combustion such that the temperature of the exhaust gas heat flow is increased.

Furthermore, a low pressure drop of an exhaust-gas aftertreatment system is desirable to improve performance and to reduce energy losses. A known method of reducing the pressure drop is to arrange two or more catalytic converters in parallel to increase the flow capacity of the exhaust-gas aftertreatment arrangement. A reduced pressure may also be achieved by increasing the size of the catalytic converter.

However, increasing the size of the catalytic converter, or arranging several catalytic converters in parallel, also increases the total thermal mass of the catalytic converters thereby exacerbating the above discussed problem relating to cold starts and certain operating conditions.

Accordingly, there is a need for an improved exhaust-gas aftertreatment arrangement allowing the pressure drop to be reduced, particularly at high engine loads, while reducing emissions due to catalytic converters operating below a preferred operating temperature.

SUMMARY OF THE INVENTION

In view of above-mentioned and other desired features of an exhaust gas aftertreatment arrangement, it is an object of the present invention to provide an improved exhaust-gas aftertreatment arrangement which helps to reduce emissions and to improve the efficiency of the engine.

According to a first aspect of the invention, there is provided an exhaust-gas aftertreatment arrangement for an internal combustion engine comprising a first catalytic converter, a second catalytic converter arranged in parallel with the first catalytic converter, the first and second catalytic converters being arranged to receive exhaust gas from an engine, a connection pipe fluidly connecting an outlet of the second catalytic converter with an inlet of the first catalytic converter, thereby allowing a flow of exhaust gas through the connection pipe, a connection pipe valve (113) configured to control a flow of exhaust gas through the connection pipe, and an outlet valve arranged in the outlet of the second catalytic converter and downstream of the location of the connection pipe, wherein the outlet valve is configured to control a flow of exhaust gas through the second catalytic converter.

Using an exhaust-gas aftertreatment arrangement comprising two parallelly arranged catalytic converters provides the advantage of high capacity and low pressure drop for improving the performance of a high performance engine. However, the high capacity also means that there is a large mass that must be heated before the catalytic converters can operate under optimal conditions.

By controlling the flow through the second catalytic converter by means of the outlet valve, the total capacity of the exhaust-gas aftertreatment arrangement can be varied based on the current operating conditions of the engine. In particular, the second catalytic converter can be closed, for example during cold start or during other operating conditions such as when the engine is idle, when the first catalytic converter has sufficient capacity for achieving the required catalytic conversion. However, since catalytic converters are most efficient when operating above a certain threshold temperature, also referred to as the operating temperature or light-off temperature, it is advantageous to heat the second catalytic converter also when it is not in use, so that it is already at the desired operating temperature when needed.

Accordingly, the present invention is based on the realization that an improved exhaust-gas aftertreatment arrangement can be achieved by using two parallelly arranged catalytic converters connected with a connection pipe. The connection pipe allows a smaller secondary flow of exhaust gas through the second catalytic converter when the outlet valve of the second catalytic converter is closed, in addition to the main flow through the first catalytic converter. This smaller secondary flow will act to heat the second catalytic converter so that it is at or near a desired operating temperature when the outlet valve is subsequently opened and the second catalytic converter is used. Thereby, an improved exhaust-gas aftertreatment arrangement is provided where the overall capacity can be controlled and where a switch from one to two converters can be made, i.e. an increase in capacity can be achieved, where the second converter can operate at the desired operating temperature from the start. This is for example advantageous at cold start of the engine.

The secondary flow of exhaust-gas through the connection pipe can occur either in the direction from the outlet of the second catalytic converter to the inlet of the first catalytic converter, or in the opposite direction when the exhaust flow passes through the connection pipe before reaching the second catalytic converter. The heating effect o the second catalytic converter effect is in principle the same irrespective of the flow direction. The flow direction of the secondary flow through the connection pipe can be selected by means of various measures which will be discussed in more detail in the following.

The connection pipe valve configured to control a flow of exhaust gas through the connection pipe is preferably closed when the outlet valve in the outlet of the second catalytic converter is opened to ensure that no exhaust gas passes through the exhaust-gas aftertreatment arrangement without having passed through a catalytic converter.

According to one embodiment of the invention, the connection pipe may be configured such that the maximum flow of exhaust gas through the connection pipe takes place when the outlet valve is closed. It is when the outlet valve is closed and the second catalytic converter is inactive that it is desirable to have secondary flow heating the second catalytic converter. Accordingly, when the outlet valve is closed, the flow of exhaust gas through the connection pipe is at its maximum. When the outlet valve is open and there is a flow of exhaust gas through the second catalytic converter and further on through the outlet, there is no longer any need for a secondary flow through the connection pipe since a main flow of exhaust gas flows through the second catalytic converter.

According to one embodiment of the invention, the inlet of the first catalytic converter may comprise a constriction having a diameter which is smaller than a diameter of adjacent portions of the inlet, and wherein the connection pipe is connected to the inlet at the constriction. In the present embodiment, the inlet can be assumed to be substantially circular having a first diameter where it receives the exhaust gas. By forming a constriction of the inlet, i.e. a portion of the inlet having a second diameter smaller than the first diameter, a pressure difference is created by means of the venturi effect, where the pressure in the inlet at the portion having the smaller diameter is lower than the pressure at the portions having a larger diameter. Furthermore, by arranging the connection pipe so that it connects to the inlet at the portion having a smaller diameter, a pressure differential is created resulting in a flow through the connection pipe from the second catalytic converter. Thereby, a small flow of exhaust gas passes through the second catalytic converter and further through the connection pipe to reach the inlet of the first catalytic converter. The utilization of the venturi effect provides a robust and failsafe mechanism for creating a flow through the connection pipe since there are no moving parts that may require servicing or replacement. Moreover, the size of the flow through the connection pipe can be varied at a design stage by varying the dimensions of the connection pipe and of the constriction.

In one embodiment of the invention, the connection pipe may be arranged in thermal contact with the first catalytic converter. To avoid that the exhaust-gas is cooled when passing through the connection pipe, the pipe is arranged in thermal contact with the first catalytic converter so that heat can be readily transferred from the first catalytic converter to the connection pipe to reduce or avoid cooling of the exhaust gas.

According to one embodiment of the invention, the exhaust-gas aftertreatment arrangement may further comprise an inlet valve arranged in the inlet of the first catalytic converter, upstream of a location where the connection pipe is connected to the inlet, the inlet valve being configured to control a pressure in the first inlet, thereby controlling a flow of exhaust gas through the connection pipe, thus providing an additional means for controlling the flow of exhaust gas through the connection pipe. The inlet valve can achieve the pressure difference causing the flow through the connection pipe also without the constriction of the inlet, but the inlet valve may also be used in combination with an inlet comprising a constriction to provide additional control over the flow through the connection pipe.

According to one embodiment of the invention, the outlet valve may be configured to open when the second catalytic converter reaches a predetermined operating temperature, thereby ensuring that the second catalytic converter is only used at the appropriate operating temperature. At the same time, the connection pipe valve is closed.

In one embodiment of the invention, the outlet valve may be configured to be controlled by an engine management system (EMS) based on an expected temperature of the second catalytic converter. By using an existing engine management system to control the outlet valve, there is no need for additional sensors or the like, thereby simplifying a practical implementation of the exhaust-gas aftertreatment arrangement. The output valve can thus be controlled using a model predicting the temperature of the second catalytic converter based on known engine performance parameters.

According to one embodiment of the invention, the outlet valve may be configured to be controlled based on a mass flow of exhaust gas from the engine. The mass flow from the engine is a parameter which typically is known by the engine management system. Moreover, the relation between mass flow and temperature of the second catalytic converter can for example be determined empirically for a particular model, or it can be calculated based on known properties of the catalytic converter, and based on the properties of the connection pipe.

According to one embodiment of the invention, the outlet valve may be configured to be controlled based on a temperature of the second catalytic converter, thereby providing a direct correlation between the temperature of the catalytic converter and the position of the outlet valve.

In one embodiment of the invention, the outlet valve may be configured to be closed if a temperature of the second catalytic converter is below a predetermined threshold value during operation of the engine. Under some circumstances, the temperature of the second catalytic converter may drop below the operating temperature also when the engine is running, and has been running for some time. Such conditions may for example be if the engine is idling or running at low rpm and/or for low exterior temperatures.

According to a second aspect of the invention, there is provided a method for controlling an exhaust gas aftertreatment arrangement comprising a first catalytic converter, a second catalytic converter arranged in parallel with the first catalytic converter, the first and second catalytic converters being arranged to receive exhaust gas from an engine, a connection pipe fluidly connecting an outlet of the second catalytic converter with an inlet of the first catalytic converter, a connection pipe valve configured to control a flow of exhaust gas through the connection pipe, and an outlet valve arranged in the outlet of the second catalytic converter and downstream of the location of the connection pipe. The method comprises controlling a flow of exhaust gas through the second catalytic converter by controlling the outlet valve.

According to one embodiment of the invention, the method may comprise controlling the outlet valve based on an estimated temperature of the second catalytic converter, wherein the estimated temperature is based on a mass flow of exhaust gas from the engine. A pre-existing model in an engine management system can thus be used to control the outlet valve so that the second catalytic converter is activated when it has reached its operating temperature.

In addition to the mass flow, the temperature of the second catalytic converter may also be based on parameters such as an exterior temperature, an engine load, a velocity of a vehicle in which the gas aftertreatment arrangement is arranged, an area of the second catalytic converter and heat transfer properties of the second catalytic converter.

Further effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing an example embodiment of the invention, wherein:

FIGS. 1a-b schematically illustrates an exhaust-gas aftertreatment arrangement according to an embodiment of the invention;

FIG. 2 schematically illustrates an exhaust-gas aftertreatment arrangement according to an embodiment of the invention.

DETAILED DESCRIPTION

Figure 3:
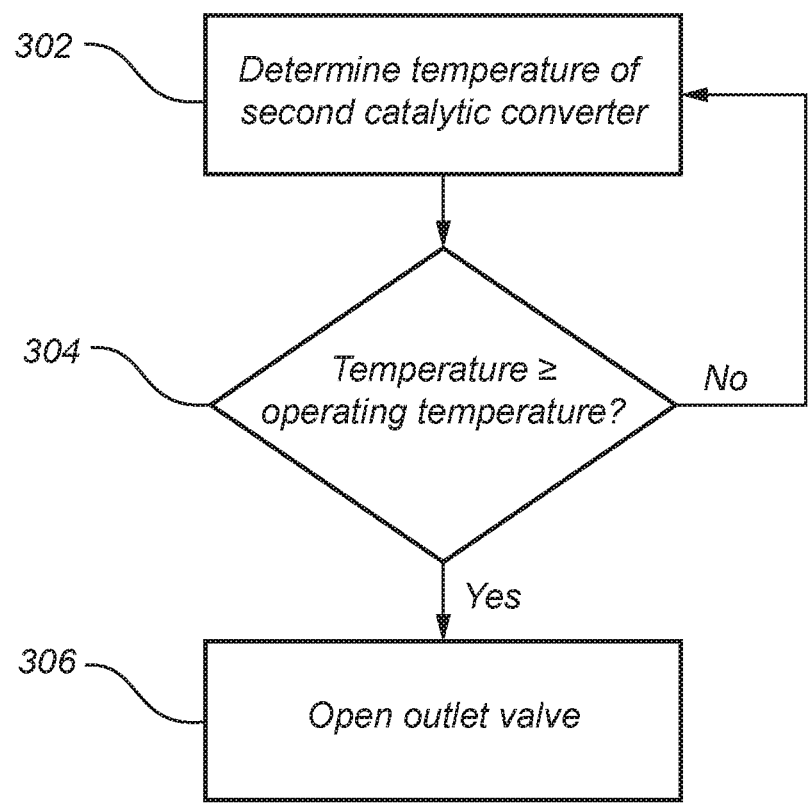
FIG. 3 is a flow chart outlining the general steps of a method according to an embodiment of the invention.

In the present detailed description, various embodiments of the system and method according to the present invention are mainly described with reference to two parallelly arranged catalytic converters, i.e. dual catalytic converters, in an exhaust-gas aftertreatment arrangement for a combustion engine.

FIGS. 1a and 1b are schematic illustrations of an exhaust-gas aftertreatment arrangement 100 for an internal combustion engine. The exhaust-gas aftertreatment arrangement 100 comprises a first catalytic converter 102 and a second catalytic converter 104 arranged in parallel with the first catalytic converter. The first and second catalytic converters 102, 104, share a common inlet portion 106 for receiving an exhaust gas flow from the exhaust manifold of an internal combustion engine. A catalytic converter which is arranged directly adjacent to the exhaust manifold of a combustion engine is often referred to as a close coupled catalytic converter (CCC). The common inlet 106 branches into two separate inlets 108, 110, for the first and second catalytic converter 102, 104, respectively. Furthermore, a connection pipe 112 is fluidly connecting an outlet 114 of the second catalytic converter 104 with the inlet 108 of the first catalytic converter 102, thereby allowing a flow of exhaust gas through the connection pipe 112. The connection pipe 112 comprises a connection pipe valve 113 controlling a flow through the connection pipe. An outlet valve 116 is arranged in the outlet 114 of the second catalytic converter 104, downstream of the location where the connection pipe 112 connects to the outlet 114. The outlet valve 116 is configured to control a flow of exhaust gas through the second catalytic converter 104. Accordingly, when the outlet valve 114 is closed, a flow of exhaust gas takes place through the second catalytic converter 104, through the connection pipe and into the inlet 108 of the first catalytic converter 102 and further on through the first catalytic converter 102. Thereby, the second catalytic converter 104 can be heated to an appropriate operating temperature before it is being put to use by opening the outlet valve 116, allowing a flow of exhaust gas through the second catalytic converter 104 and further on through the outlet 114. Herein, the outlet 114 from the second catalytic converter 104 is connected with the outlet 118 from the first catalytic converter to form a common outlet 120 from the exhaust gas aftertreatment arrangement 100.

The connection pipe valve 113 is illustrated herein as a separate valve arranged in the connection pipe 112 near the outlet 114 of the second catalytic converter 104. However, the connection pipe valve 113 may on principle be located anywhere within the connection pipe 112 where it is capable of controlling a flow of exhaust gas through the connection pipe. Moreover, according to some embodiments, the connection pipe valve maybe integrated with the outlet valve 116 such that the flow through the connection pipe is automatically closed when the outlet valve 116 opens. The functionality of both the connection pipe valve 113 and the outlet valve 116 may also be integrated in one physical valve. It can thus be assumed that the connection pipe valve 113 is closed when the outlet valve 116 is open, and vice versa.

In FIG. 1a, the first and second catalytic converters 102, 104, are illustrated as having the same size. However, it is equally possible that the two catalytic converters may have different size. For example, the first catalytic converter may be smaller than the second catalytic converter such that the first catalytic converter having a smaller thermal mass is used during startup of the engine thereby heating up faster, and where the second, larger catalytic converter is activated once an operating temperature of the second catalytic converter is reached. The configuration and size of the catalytic converters can be adapted based on the requirements of a particular application, where for example a high performance engine requires a higher catalytic conversion capacity and a low pressure drop over the exhaust gas aftertreatment arrangement making it less preferable with a small catalytic converter, whereas in an application where the primary aim is to reduce emissions, two catalytic converters of different size may be used without significant drawbacks.

The connection pipe 112 has a diameter which is smaller than the diameter of the respective catalytic converters, 102, 104 such that the flow of exhaust gas through the connection pipe 112 is smaller than the main flow through the catalytic converters. Moreover, the connection pipe 112 is arranged such that the maximum flow through the connection pipe 112 takes place when the outlet valve 116 is closed. This implies that the flow through the connection pipe 112 is reduced when the outlet valve 116 is opened. The outlet valve 116 may be an electronically controlled on/off valve, having the positions of fully open or fully closed. However, the outlet valve 116 may also be a variable valve such that the flow through the outlet 114, and consequently through the second catalytic converter 104 can be continuously and variably regulated.

In the exhaust gas aftertreatment arrangement 100 illustrated in FIG. 1a, the flow through the connection pipe 112 is achieved through a pressure difference between the inlet 122 and the outlet 124 of the connection pipe 112. The pressure difference in turn arises from a constriction 126 of the inlet 108, which is illustrated in further detail in FIG. 1b. The constriction 126 is a portion of the substantially tubular inlet 108 which has a smaller diameter than the adjacent portions of the inlet 108. The constriction gives rise to the venturi effect where the pressure in the constriction 108 is lower than the pressure in the adjacent portions having the larger diameter. Since the outlet 124 of the connection pipe 112 opens up into the portion of the outlet 108 comprising the constriction, the pressure at the outlet 124 of the connection pipe is lower than the pressure at the inlet of the connection pipe 122, thereby creating a pressure difference which induces a flow through the second catalytic converter 104 and on through the connection pipe 112.

The amount of flow though the second catalytic converter 104 can be controlled by controlling the diameter and geometry of the constriction 126. In FIG. 1b, it can be seen that the portion of the constriction being located towards the engine, i.e. upstream of the location of the connection pipe 112 has a larger curvature compared to the portion of the constriction nearer the catalytic converter, which is a commonly used configuration for achieving the venturi effect. However, it is also possible to use other shapes, such as a regular convex constriction.

Even though the exhaust gas aftertreatment arrangement 100 illustrated in FIGS. 1a and 1b exhibits a flow of exhaust gas going first through the second catalytic converter 104 and further through the connection pipe 112, it is also possible to have an arrangement where the flow direction is the opposite, i.e. from the inlet 108 of the first catalytic converter 102 and further on through the connection pipe 112 and on through the second catalytic converter 104.

Moreover, FIG. 1a illustrates that the connection pipe 112 is arranged adjacent to, and in thermal contact with the first catalytic converter 102. Thereby, excess heat from the first catalytic converter 102 can be used to reheat the exhaust gas which has flown through the second catalytic converter 104, and which thus has been cooled down, to avoid unnecessary cooling of the first catalytic converter 102. The connection pipe 112 may for example be in physical contact with the outer case of the first catalytic converter 102 to enable the heat transfer.

An alternative configuration is illustrated in FIG. 2, where the constriction of FIG. 1a is replaced by an inlet valve 202 arranged in the inlet 108 of the first catalytic converter 102, upstream of a location where the connection pipe 112 is connected to the inlet 108. The inlet valve 202 is configured to control a pressure in the first inlet 108, thereby controlling a flow of exhaust gas through the connection pipe 112. A pressure difference causing a flow through the connection pipe 112 may also be achieved by a difference in dimensions between first and second catalytic converters or a difference in dimensions between the components described herein. In the same way as described in relation to FIG. 1a, the flow through the second catalytic converter 104 is controlled by controlling the valve 116 in the outlet 114 of the second catalytic converter 104.

FIG. 3 is a flow chart outlining the general steps in a method of controlling the above described exhaust gas aftertreatment arrangement 100. The method comprises determining 302 a current temperature of the second catalytic converter 104. The temperature may be determined by estimating a temperature based on a mass flow of exhaust gas from the engine, where the relation between the total mass flow from the engine and the temperature of the second catalytic converter 104 is previously known. The mass flow from the engine can for example be monitored by an engine management system (EMS) for different operating conditions of the engine. The EMS can calculate the current temperature based on input parameters such as mass flow, load of the engine, heat transfer properties of the catalytic converter and, exterior temperature, velocity etc. It is also possible to directly determine the temperature of the second catalytic converter 104 by means of a suitably arranged temperature sensor.

Thereafter, the determined temperature is compared 304 to a preferred operating temperature, such as 350° C., and if the determined temperature is above the operating temperature, the outlet valve 116 of the second catalytic converter 104 is opened 306 and the connection pipe valve 113 is closed. If the measured temperature is below the threshold value, the valve 116 remains closed. An acceptable operating temperature for a catalytic converter can typically be in the range of 300 to 400° C., for example 350° C. However, the operating temperature may be different for different types of catalytic converters In the described method, the starting point is that the temperature of the second catalytic converter 104 is below its operating temperature and that the valve 116 is closed, which for example is preferable during a cold start of the engine. It is also possible to close the valve if the temperature of the second catalytic converter 104 drops below the operating temperature, which for example may happen if the engine is idling for an extended duration.

Even though the invention has been described with reference to specific exemplifying embodiments thereof, many different alterations, modifications and the like will become apparent for those skilled in the art. Also, it should be noted that parts of the device may be omitted, interchanged or arranged in various ways, the device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

What is claimed is:

1. An exhaust-gas aftertreatment arrangement for an internal combustion engine comprising:
   a first catalytic converter;
   a second catalytic converter arranged in parallel with the first catalytic converter, the first and second catalytic converters being arranged to receive exhaust gas from an engine;
   a connection pipe fluidly connecting an outlet of the second catalytic converter with an inlet of the first catalytic converter, thereby allowing a flow of exhaust gas through the connection pipe,
   wherein the inlet of the first catalytic converter comprises a constriction having a diameter which is smaller than a diameter of adjacent portions of the inlet, and wherein the connection pipe is connected to the inlet at the constriction,
   wherein the diameter of the constriction induces a lower pressure at the constriction in relation to a pressure in adjacent portions of the inlet of the first catalytic converter and in relation to an inlet of the connection pipe, which induces a pressure difference and causes exhaust gas to flow through the second catalytic converter and the connection pipe;
   a connection pipe valve configured to control a flow of exhaust gas through the connection pipe; and
   an outlet valve arranged in the outlet of the second catalytic converter and downstream of the location of the connection pipe, wherein the outlet valve is configured to control a flow of exhaust gas through the second catalytic converter.

2. The arrangement according to claim 1, wherein the connection pipe is configured such that the maximum flow of exhaust gas through the connection pipe takes place when the outlet valve is closed.

3. The arrangement according to claim 1, wherein the connection pipe is arranged in thermal contact with the first catalytic converter.

4. The arrangement according to claim 1, further comprising an inlet valve arranged in the inlet of the first catalytic converter, upstream of a location where the connection pipe is connected to the inlet, the inlet valve being configured to control a pressure in the first inlet, thereby controlling a flow of exhaust gas through the connection pipe.

5. The arrangement according to claim 1, wherein the outlet valve is configured to open when the second catalytic converter reaches a predetermined operating temperature.

6. The arrangement according to claim 1, wherein the outlet valve is configured to be controlled by an engine management system based on an expected operating temperature of the second catalytic converter.

7. The arrangement according to claim 1, wherein the outlet valve is configured to be controlled based on a mass flow of exhaust gas from the engine.

8. The arrangement according to claim 1, wherein the outlet valve is configured to be controlled based on a temperature of the second catalytic converter.

9. The arrangement according to claim 8, wherein the outlet valve is configured to be closed if a temperature of the second catalytic converter is below a predetermined threshold value during operation of the engine.

10. The arrangement according to claim 1, wherein the valve is an electrically controlled on/off valve.

11. A method for controlling an exhaust gas aftertreatment arrangement comprising:
a first catalytic converter;
a second catalytic converter arranged in parallel with the first catalytic converter, the first and second catalytic converters being arranged to receive exhaust gas from an engine;
a connection pipe fluidly connecting an outlet of the second catalytic converter with an inlet of the first catalytic converter,
wherein the inlet of the first catalytic converter comprises a constriction having a diameter which is smaller than a diameter of adjacent portions of the inlet, and wherein the connection pipe is connected to the inlet at the constriction,
wherein the diameter of the constriction induces a lower pressure at the constriction in relation to a pressure in adjacent portions of the inlet of the first catalytic converter and in relation to an inlet of the connection pipe, which induces a pressure difference and causes exhaust gas to flow through the second catalytic converter and the connection pipe;
a connection pipe valve configured to control a flow of exhaust gas through the connection pipe; and
an outlet valve arranged in the outlet of the second catalytic converter and downstream of the location of the connection pipe, the method comprising:
controlling a flow of exhaust gas through the second catalytic converter by controlling the outlet valve.

12. The method according to claim 11, further comprising controlling the outlet valve based on an estimated temperature of the second catalytic converter, wherein the estimated temperature is based on a mass flow of exhaust gas from the engine.

13. The method according to claim 12, wherein the estimated temperature is further based on at least one of an exterior temperature, an engine load, a velocity of a vehicle in which the gas aftertreatment arrangement is arranged, an area of the second catalytic converter and heat transfer properties of the second catalytic converter.

14. The method according to claim 11, further comprising opening the outlet valve and closing the connection pipe valve when a temperature of the second catalytic converter reaches a predetermined operating temperature.

* * * * *